(12) United States Patent
Park

(10) Patent No.: US 11,436,558 B2
(45) Date of Patent: Sep. 6, 2022

(54) REFRIGERATOR, OPERATING METHOD THEREOF AND INFORMATION PROVIDING SYSTEM

(71) Applicant: LG ELECTRONICS INC., Seoul (KR)

(72) Inventor: Yoon Gon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 417 days.

(21) Appl. No.: 16/575,849

(22) Filed: Sep. 19, 2019

(65) Prior Publication Data

US 2020/0013005 A1 Jan. 9, 2020

(30) Foreign Application Priority Data

Aug. 23, 2019 (KR) ........................ 10-2019-0103916

(51) Int. Cl.
| | |
|---|---|
| G06Q 10/08 | (2012.01) |
| F25D 29/00 | (2006.01) |
| G06V 30/40 | (2022.01) |
| G06V 30/10 | (2022.01) |
| F25D 23/02 | (2006.01) |
| F25D 27/00 | (2006.01) |
| G06T 19/00 | (2011.01) |

(52) U.S. Cl.
CPC ......... *G06Q 10/087* (2013.01); *F25D 23/028* (2013.01); *F25D 27/005* (2013.01); *F25D 29/005* (2013.01); *G06T 19/006* (2013.01); *F25D 2327/00* (2013.01); *F25D 2400/361* (2013.01); *F25D 2500/06* (2013.01); *F25D 2700/06* (2013.01); *G06V 30/10* (2022.01); *G06V 30/40* (2022.01)

(58) Field of Classification Search
CPC ............ F25D 2700/06; F25D 2500/06; F25D 23/028; F25D 27/005; F25D 29/005; F25D 29/00; G06V 30/40; G06V 30/10; G06Q 10/087
See application file for complete search history.

(56) References Cited

U.S. PATENT DOCUMENTS

| | | | |
|---|---|---|---|
| 10,242,400 B1 * | 3/2019 | Eraker | G06F 3/04842 |
| 2017/0161806 A1 * | 6/2017 | Pearson | G06Q 30/0603 |
| 2018/0276473 A1 * | 9/2018 | Kim | G06K 9/00671 |

FOREIGN PATENT DOCUMENTS

| | | | |
|---|---|---|---|
| KR | 10-2009-0105256 A | | 10/2009 |
| KR | 20120117464 A | * | 10/2012 |
| KR | 10-1756620 B1 | | 7/2017 |

* cited by examiner

*Primary Examiner* — Lionel Nouketcha
(74) *Attorney, Agent, or Firm* — Birch, Stewart, Kolasch & Birch, LLP

(57) ABSTRACT

Disclosed is a refrigerator configured to perform artificial intelligence (AI) algorithms and/or machine learning algorithms, communicate with other electronic devices and external servers in a 5G communication environment, and provide information based on an image. The refrigerator includes a camera, a display, and a processor. Accordingly, various services can be provided to improve user convenience by accurately identifying a photographing target.

14 Claims, 7 Drawing Sheets

REFRIGERATOR, OPERATING METHOD THEREOF AND INFORMATION PROVIDING SYSTEM

CROSS-REFERENCE TO RELATED APPLICATION

This present application claims benefit of priority to Korean Patent Application No. 10-2019-0103916, entitled "Refrigerator, operating method thereof and information providing system" filed on Aug. 23, 2019, in the Korean Intellectual Property Office, the entire disclosure of which is incorporated herein by reference.

BACKGROUND

1. Technical Field

The present disclosure relates to a refrigerator, an operating method thereof, and an information providing system. More specifically, the present disclosure relates to a refrigerator and an operating method thereof configured to recognize an item placed in a storage space, and an information providing system which provides information of an item to a refrigerator.

2. Description of Related Art

A refrigerator is a device for storing items, and in general, items stored in a refrigerator have expiration dates. Therefore, to more effectively manage the items, the expiration date of each item must be managed.

A mobile terminal disclosed in related art 1 photographs a barcode of an item placed inside a refrigerator, matches item information corresponding to the photographed barcode information and the barcode, and transmits the matching information to the refrigerator. The refrigerator stores the matching information in a memory to manage the items inside the refrigerator.

However, when items are managed through the method according to related art 1, a barcode must be photographed for every item, and a procedure for matching the item information corresponding to the photographed barcode must be performed repeatedly, thereby causing difficulty in management.

A refrigerator disclosed in related art 2, which provides a notification for expiration dates of stored food items, photographs an item by using a plurality of cameras, and extracts the expiration date information of an item by an image analysis method.

However, in the case of related art 2, only content describing recognition of the expiration dates of the items by using artificial intelligence is disclosed, and a detailed implementation method regarding how the expiration dates are recognized is not disclosed.

SUMMARY OF THE INVENTION

An aspect of the present disclosure is to provide a refrigerator configured to recognize an item placed in a storage space based on text in a photographed image of the item, and a method of operation thereof.

Another aspect of the present disclosure is to provide a refrigerator configured to determine, when an item is placed in a storage space, whether the item is an existing item or a new item, and a method of operation thereof.

Still another aspect of the present disclosure is to provide an information providing system configured to perform an artificial intelligence operation in order to recognize items that the refrigerator cannot identify.

The present disclosure is not limited to the above-mentioned aspects, and other aspects, which are not mentioned, may be clearly understood by those skilled in the art from the description below.

A refrigerator according to an embodiment of the present disclosure may include a camera configured to photograph an item placed in one or more storage spaces, a communicator configured to communicate with an information providing system, a memory configured to store item information of the item and text information displayed on an exterior of the item, and a processor configured to identify the item placed in the storage space by recognizing text information included in a photographed image of the item photographed by the camera, and comparing the recognized text information with the text information displayed on the exterior of the item stored in the memory.

When the item placed in the storage space is not identified in the comparison, the processor may transmit the photographed image to the information providing system via the communicator.

In addition, an operating method of a refrigerator according to another embodiment of the present disclosure may include photographing an item placed in one or more storage spaces, recognizing text information included in a photographed image of the item placed in the storage space, identifying the item placed in the storage space by comparing the recognized text information with previously stored text information, and transmitting the photographed image of the item placed in the storage space to the information providing system when the item placed in the storage space is not identified in the comparison.

Further, an information providing system configured to communicate with one or more refrigerators according to an embodiment of the present disclosure may include a system communicator, a system memory configured to store item information of one or more items and text information displayed on an exterior of the items, and a system processor configured to receive, via the system communicator, a photographed image of an item which was not identified by the refrigerator, recognize the item in the photographed image, and transmit, via the system communicator, item information of the item and text information displayed on the exterior of the item to the refrigerator which provided the photographed image.

According to various embodiments of the present disclosure, an item placed in a storage space of a refrigerator can be easily identified based on text without performing a complex operation, and a new storage item and an existing storage item in the refrigerator can be distinguished from one another, thereby improving the efficiency of item management.

In addition, identification of an item which could not be identified by the refrigerator itself can be performed with the help of an information providing system.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
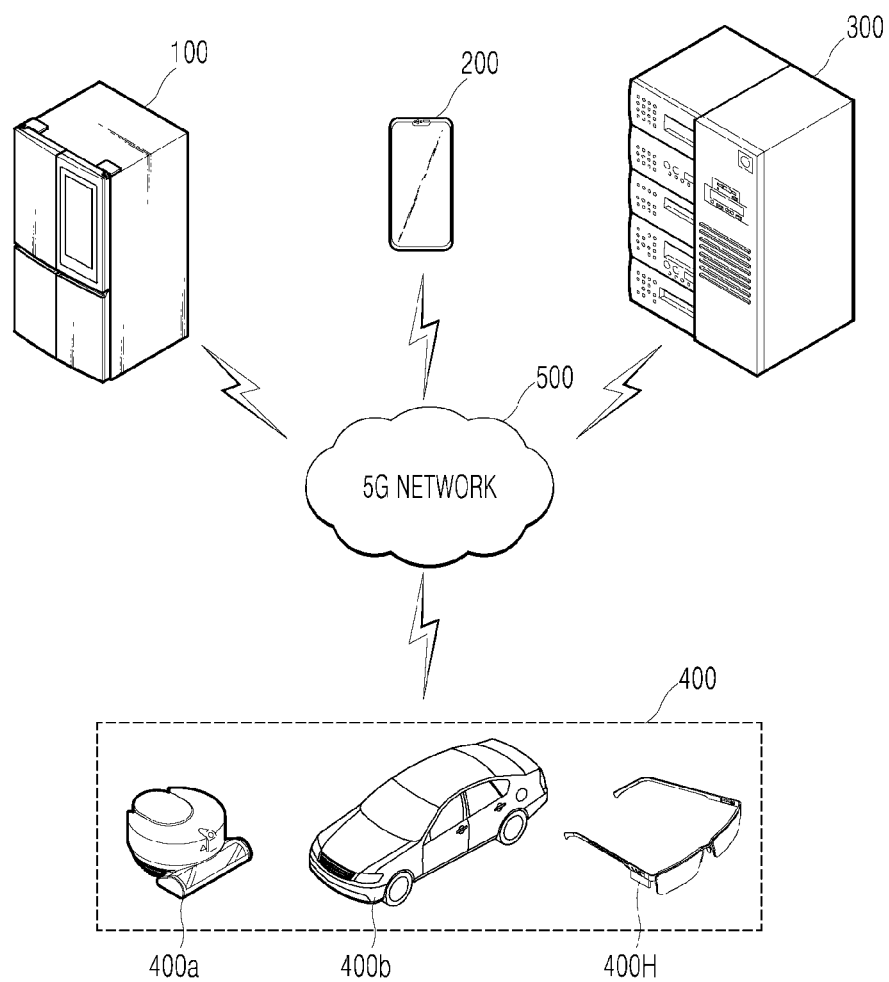
FIG. 1 is a schematic diagram illustrating a 5G network-based cloud system according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized. Since various embodiments of the present disclosure may use techniques related to artificial intelligence and extended reality, the following is a brief description of artificial intelligence and extended reality.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating a model parameter, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, a hyperparameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

Extended reality (XR) collectively refers to virtual reality (VR), augmented reality (AR), and mixed reality (MR). VR technology provides real world objects or backgrounds only in the form of CG images, AR technology provides virtual CG images overlaid on real object images, and MR technology employs computer graphics technology to mix and combine virtual objects with the real world.

MR technology is similar to AR technology in that both technologies involve physical objects being displayed together with virtual objects. However, while virtual objects supplement physical objects in AR, virtual and physical objects co-exist as equivalents in MR.

XR technology may be applied to a head-mounted display (HMD), a head-up display (HUD), a mobile phone, a tablet PC, a laptop computer, a desktop computer, a TV, digital signage, and the like. A device employing XR technology may be referred to as an XR device.

FIG. 1 illustrates a cloud system based on a 5G network according to an embodiment of the present disclosure.

Referring to FIG. 1, a cloud system may include a refrigerator 100, a mobile terminal 200, an information providing system 300, various devices 400, and a 5G network 500.

The refrigerator 100 may include a plurality of storage spaces, and may include a refrigerator including two to five doors. The refrigerator described in the present application is assumed to include five doors (four doors+one door), but the present disclosure is not limited thereto.

The refrigerator 100 may include a camera (121 of FIG. 3), may photograph a plurality of items disposed in the storage space of the refrigerator 100 using the camera 121, and may recognize text information including a trademark on the exterior of an item on the basis of text in a photographed image.

The mobile terminal 200 may provide information on the basis of an image, and may be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an Ultrabook, a wearable device (for example, a smartwatch, a smart glass, and a head mounted display (HMD)). According to an alternative embodiment, the mobile terminal 200 may be implemented as, for example, a digital TV, a desktop computer, or a digital signage.

The mobile terminal 200 may directly receive information provided from the refrigerator 100 through the 5G network 500. The mobile terminal 200 may include an application program for managing items in the refrigerator 100.

The information providing system 300 may receive information about an item in the refrigerator 100 that has not been identified, and recognize the item. The information providing system 300 may recognize the item on the basis of an image, and may include an artificial intelligence related module.

The various devices 400 may include devices such as a robot cleaner 400a, an autonomous vehicle 400b, and a smart glass 400H, and may transmit and receive various information through the 5G network 500.

The various devices 400 may be connected by wire or wirelessly to the refrigerator 100, the mobile terminal 200, and the information providing system 300, via a 5G network 500 (for example, the Internet).

The refrigerator 100, the mobile terminal 200, the information providing system 300, and the various devices 400 are all equipped with a 5G module capable of transmitting and receiving data at a speed of 100 Mbps to 20 Gbps (or higher), and may thus transmit large video files to various devices, and may operate at low power to reduce power consumption. However, the transmission rate may be implemented differently depending on the embodiment.

The 5G network 500 may include, for example, a 5G mobile communication network, a local area network, and the Internet, and thereby provide a communication environment for devices to communicate in a wired or wireless manner.

Figure 2:
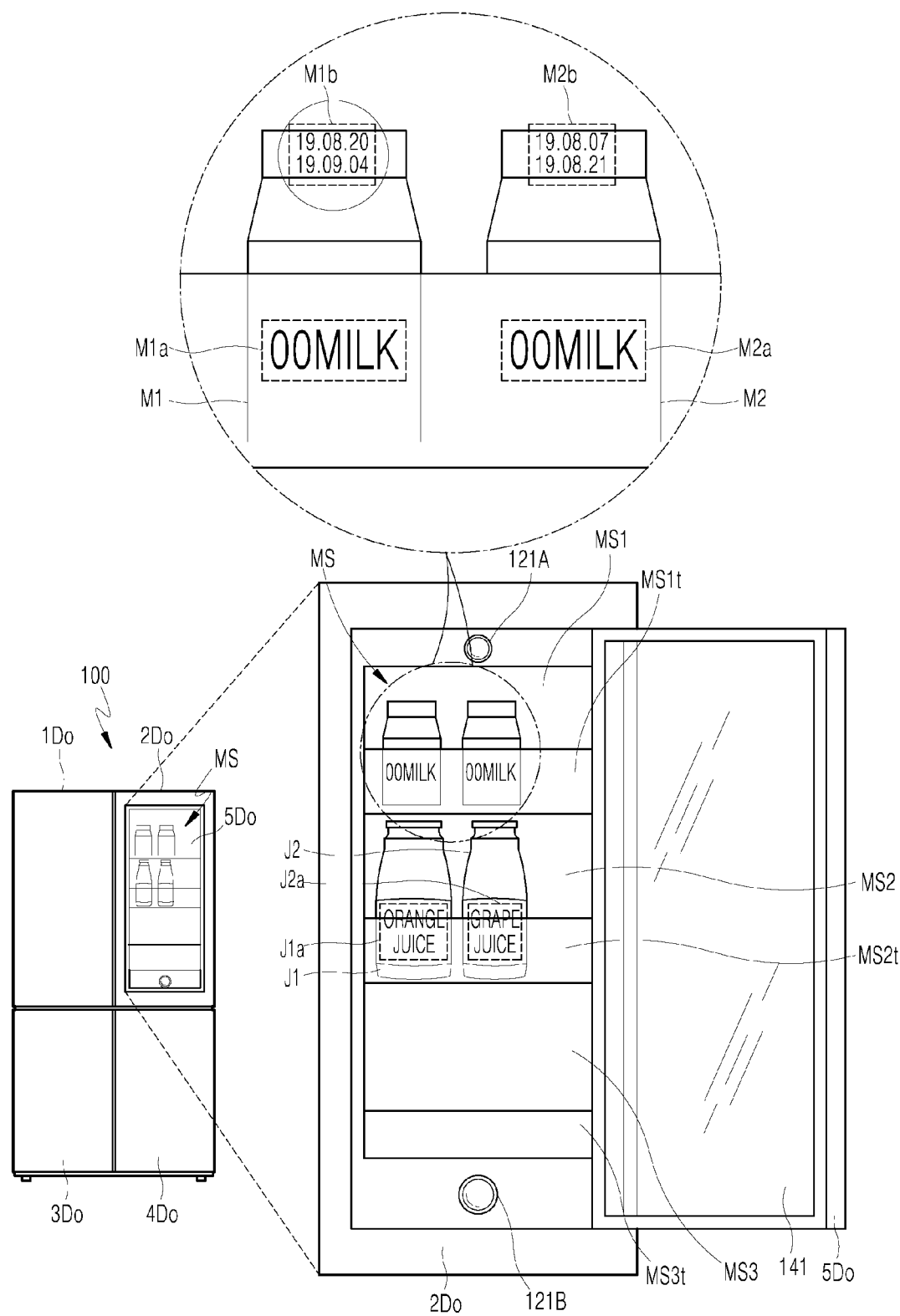
FIG. 2 is a schematic diagram illustrating an operating method of a refrigerator configured to identify an item placed in a storage space according to an embodiment of the present disclosure.

FIG. 2 is a schematic diagram illustrating operation of a refrigerator 100 according to an embodiment of the present disclosure.

The refrigerator 100 may include a main body and a plurality of doors 1Do to 4Do. The main body may include a storage compartment including a refrigerating compartment and a freezer compartment, and may include a plurality of storage spaces for storing various items (such as food and industrial products).

Each of the plurality of doors 1Do to 4Do may be hinged to the main body so as to rotate in front of one side of the storage compartment. A plurality of storage spaces may also be disposed inside the plurality of doors 1Do to 4Do. A first door 1Do and a second door 2Do may be doors for opening and closing the refrigerating compartment, and a third door 3Do and a fourth door 4Do may be doors for opening and closing the freezer compartment, but the location of the refrigerating compartment and the freezing compartment may be implemented differently depending on the embodiment.

In particular, a specific door (the second door 2Do) may further include an additional door (a fifth door 5Do). The additional door 5Do may be referred to as a home bar, and may be a door for opening and closing one or more storage spaces (for example, a magic space MS) inside the specific door 2Do.

Items such as dairy products and beverages may be disposed in the magic space MS, and the items may display text information including a trademark on their exteriors. It may be assumed that frequently used items and items that can be identified on the basis of text are likely to be disposed in the magic space MS.

Here, the fifth door 5Do may include a display (141 of FIG. 3), and in particular, the display 141 may be implemented as a transparent display.

One or more cameras 121A and 121B may be disposed in the internal storage space MS of the second door 2Do to photograph the items disposed in the internal storage space MS.

For example, the plurality of cameras 121A and 121B may photograph a first milk M1 and a second milk M2 disposed in an upper storage space MS1 of the internal storage space MS, and the first milk M1 and the second milk M2 may be disposed on an upper shelf MS1$t$. In addition, the plurality of cameras 121A and 121B may photograph a first juice J1 and a second juice J2 disposed in a middle storage space MS2 of the internal storage space MS, and the first juice J1 and the second juice J2 may be disposed on a middle shelf MS2$t$.

Here, a processor 190 of the refrigerator 100 may recognize text information M1$a$, M1$b$, M2$a$, and M2$b$ in the item images photographed by the plurality of cameras 121A and 121B. Here, the number of cameras may be implemented differently depending on the embodiment. In addition, when a separate camera is provided, various items disposed in the storage compartment of the body may be photographed.

Figure 3:
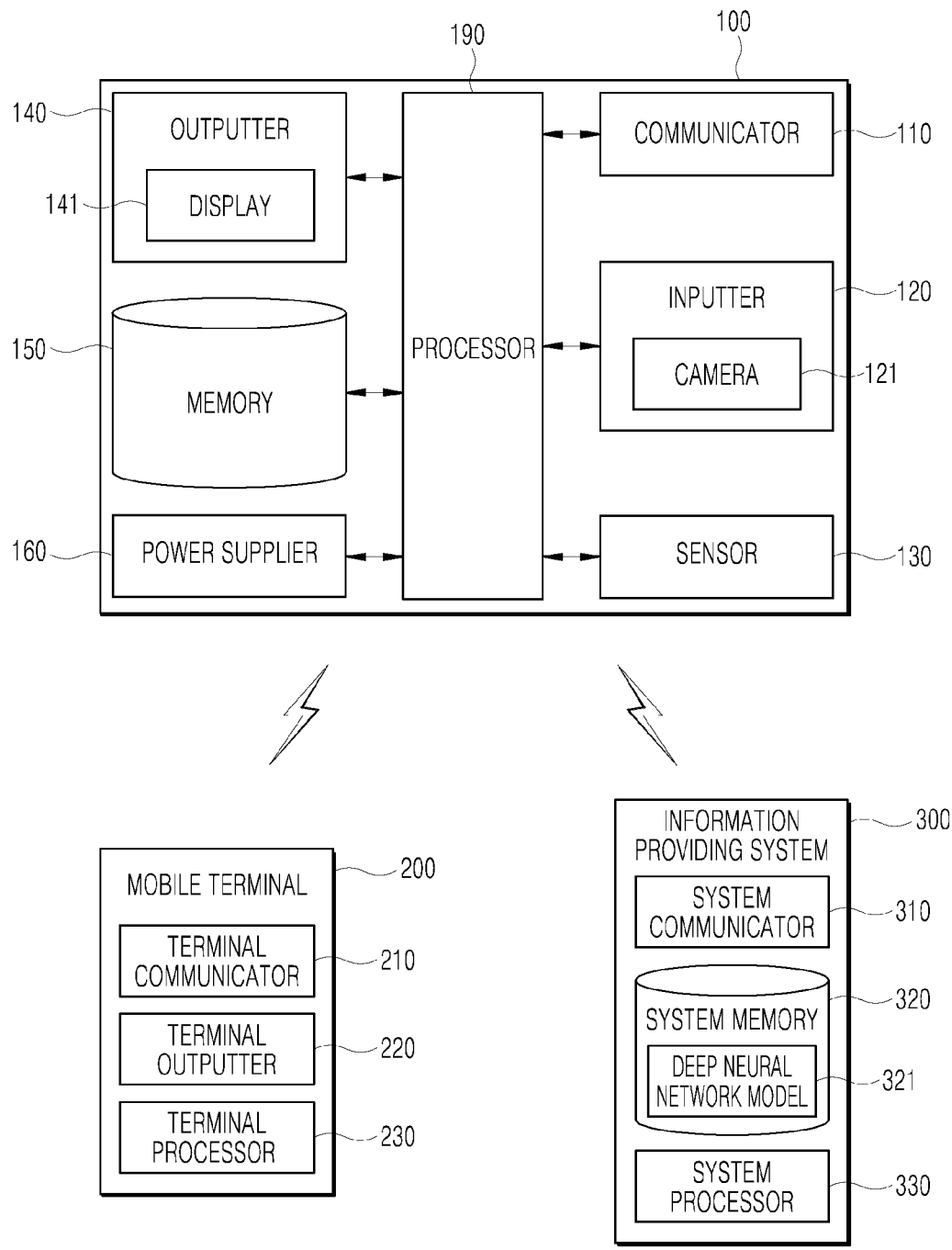
FIG. 3 is a functional block diagram illustrating a structure of a refrigerator in communication with a mobile terminal and an information providing system according to an embodiment of the present disclosure.

FIG. 3 is a functional block diagram illustrating a configuration of a refrigerator 100 communicating with a mobile terminal 200 and an information providing system 300 according to an embodiment of the present disclosure.

Referring to FIG. 3, the refrigerator 100 may include a communicator 110, an inputter 120, a sensor 130, an outputter 140, a memory 150, a power supplier 160, and a processor 190. However, the components illustrated in FIG. 3 are not essential to implementation of the refrigerator 100, and the refrigerator 100 described in the current specification may have more or fewer components than the above-described components.

First, the communicator 110 may transmit and receive data with the mobile terminal 200 and the information providing system 300 using wired or wireless communication technology. For example, the communicator 110 may transmit and receive information such as sensor information, user input information, learning model information, and control signal information with the mobile terminal 200 and the information providing system 300, but the transmission information is not limited thereto.

In this case, the communications technology used by the communicator 110 may be technology such as global system for mobile communication (GSM), code division multiple access (CDMA), long term evolution (LTE), 5G, wireless LAN (WLAN), wireless fidelity (Wi-Fi), Bluetooth™, radio frequency identification (RFID), Infrared Data Association (IrDA), ZigBee, and near field communication (NFC).

The inputter 120 may include a camera 121 for inputting an image signal, a microphone for receiving an audio signal, and a user inputter for receiving information inputted from a user. Here, the signal obtained from the camera 121 or the microphone may be referred to as sensing data or sensor information by treating the camera 121 or the microphone as a sensor. The camera 121 may photograph an item placed in various storage spaces of the refrigerator 100. Here, the camera 121 may be implemented as a plurality of cameras 121A, 121B, as shown in FIG. 2, and may be implemented to include two or more cameras.

The inputter 120 may obtain, for example, learning data for model learning and input data used when output is obtained using a learning model. The inputter 120 may obtain raw input data. In this case, the processor 190 may extract an input feature by preprocessing the input data.

The sensor 130 may obtain at least one of internal information of the refrigerator 100, surrounding environment information of the refrigerator 100, or user information, by using various sensors.

The sensor 130 may include a distance sensor, a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (lidar) sensor, radar, or a combination thereof. Here, the distance sensor may measure the distance between the item disposed in the shooting range and the camera 121.

The outputter 140 may generate an output related to visual, auditory or tactile senses. The outputter 140 may include a display 141 for outputting visual information, a speaker for outputting auditory information, and a haptic module for outputting tactile information, and a light emitter for providing light to a specific storage space of the refrigerator 100.

The memory 150 may store data needed to support various functions of the refrigerator 100. The memory 150 may store a plurality of application programs (or applications) to be driven by the refrigerator 100, data for operating the refrigerator 100, and commands.

The memory 150 may store item information of the item and text information displayed on the exterior of the item. The item information and the text information displayed on the exterior of the item may be received from the information providing system 300 and stored even when the item has never been placed in the refrigerator 100.

In addition, the memory 150 may separately store information of items that have been disposed in the refrigerator 100 even once. Further, the processor 190 may separately manage items frequently placed in the refrigerator 100, and if a corresponding item is not placed in the refrigerator 100 for a predetermined period of time, the processor 190 may notify the mobile terminal 200 of this fact. Also, the processor 190 may notify the mobile terminal 200 when the expiration date of frequently used items has passed.

In addition, the memory 150 may store information necessary to perform an operation using artificial intelligence, machine learning, or an artificial neural network. The memory 150 may store a deep neural network model. The deep neural network model may be used to infer a result value with respect to new input data rather than learning data, and the inferred value may be used as a basis for a determination to perform an operation. The deep neural network model corresponds to a learning model, and may include a model for recognizing, for example, a trademark, a character, and a shape.

Under control of the processor 190, the power supplier 160 receives power from an external power source and an internal power source to supply power to each of the components of the refrigerator 100. The power supplier 160 may include a battery, and the battery may be an embedded battery or a replaceable battery. The battery may be charged by a wired or wireless charging method, and the wireless charging method may include a magnetic induction method or a magnetic resonance method.

The processor 190 is a module configured to control the components of the refrigerator 100. The processor may refer to a data processing device built in hardware, which includes physically structured circuits in order to perform functions represented as a code or command present in a program. Examples of the data processing device built in a hardware include, but are not limited to, processing devices such as a microprocessor, a central processing unit (CPU), a processor core, a multiprocessor, an application-specific integrated circuit (ASIC), and a field programmable gate array (FPGA).

The processor 190 may be equipped with a separate learning processor for performing artificial intelligence operations, or may itself include a learning processor. The processor 190 may train a model composed of an artificial neural network using learning data. Here the trained artificial neural network may be referred to as a trained model. The trained model may be used to infer a result value with respect to new input data rather than learning data, and the inferred value may be used as a basis for a determination to perform an operation.

Here, the processor 190 may be implemented to perform artificial intelligence processing with a learning processor of an artificial intelligence server (for example, the information providing system 300).

Next, the mobile terminal 200 is a device that can communicate with the refrigerator 100 and may control functions and operations of the refrigerator 100 or may use information received from the refrigerator 100.

The mobile terminal 200 may include a terminal communicator 210, a terminal outputter 220, and a terminal processor 230, and these components may correspond to the communicator 110, the outputter 140, and the processor 190 of the refrigerator. The mobile terminal 200 includes more components than the above components, but these will not be described since they are not specifically dealt with in the present specification.

The information providing system 300 may include a system communicator 310, a system memory 320, and a system processor 330. Excluding overlapping descriptions, the system memory 320 may store item information of one or more items and text information displayed on the exterior of the items in the system memory 320.

The system processor 330 may receive, via the system communicator 310, a photographed image of an item which was not identified by the refrigerator 100, recognize the item in the photographed image, and transmit, via the system communicator 310, item information of the item and text information displayed on the exterior of the item to the refrigerator 100.

The system processor 330 may store a deep neural network model 321 in the system memory 320. The deep neural network model 321 may be used to infer a result value with respect to new input data rather than learning data, and the inferred value may be used as a basis for a determination to perform an operation. The deep neural network model corresponds to a learning model.

In a training (learning) step, the deep neural network model 321 may receive input of a plurality of item images, and estimate items in the inputted item images. To this end, information of the actual items corresponding to the item images may be inputted as ground truth. Accordingly, the deep neural network model 321 may be established, and the accuracy of the deep neural network model 321 may be verified.

Further, the deep neural network model 321 may recognize item information of an item and text information displayed on the exterior of the item (including parts even in the interior of the item that are visible by a specific function) in the photographed image of the item, match the recognized text information with the item, and store the matched text information and item in the system memory 320.

The deep neural network model 321 may estimate an item in the photographed image, and may estimate text information (including, for example, a trademark, text, and a shape) of the item. To this end, the deep neural network model 321 may receive input of text information of the actual item corresponding to the image photographed in the training step as ground truth. In addition, the system processor 330 may store, in the system memory 320, information (such as item type information, shape information, and manufacturer information) of items estimated on the network.

Again, the processor 190 of the refrigerator 100 will be described below.

The processor 190 may photograph an item placed in a plurality of storage spaces of the refrigerator 100 using a camera 121, which may be implemented as a plurality of cameras, and may recognize text information displayed on the exterior of the item included in the photographed image.

Specifically, the processor 190 may recognize text information, for example, trademark information, character information, and shape information, disposed on the exterior of the photographed item image. The processor 190 may recognize text information by operating a program based on text-based recognition. The processor 190 may recognize text information included in the photographed image by using an image processing program.

The processor 190 may identify the item placed in the storage space by comparing the recognized text information with text information displayed on the exterior of many items stored in the memory 150. The item information and the text information of the item stored in the memory 150 may be stored without limitation when the refrigerator 100 is operating normally. To this end, the processor 190 may store item information (such as item type information, text information disposed on the exterior of the item, and item attribute information) of various items in the memory 150 in advance.

When the item placed in the storage space is not identified in the comparison of the text information, the processor 190 may transmit a photographed image of the item to the information providing system 300 using the communicator 110. That is, due to computing power limitations of the refrigerator 100, the refrigerator 100 may request help from the information providing system 300.

The processor 190 may store expiration date information of the item in the memory 150. The processor 190 may receive expiration date information of the item from the information providing system 300, and store the received expiration date information. In addition, the processor 190 may recognize the expiration date information of an identified item in the storage space on the basis of text, and store the recognized expiration date information in the memory 150. Even if the item is not identified, when the expiration date information is recognized on the basis of text, the processor 190 may store the expiration date information in the memory 150.

The processor 190 may distinguish whether the identified item is an item that was previously placed in the storage space or an item that is newly placed in the storage space, based on the expiration date information of the item stored in the memory 150. That is, the processor can distinguish between an existing storage item and a new storage item of the refrigerator 100.

In this case, the refrigerator 100 may distinguish whether an item in the refrigerator 100 is an item that was previously placed in the storage space but was repositioned after a certain amount of time, or whether the item is an item that is newly placed in the refrigerator 100. Accordingly, items placed in the storage space may be managed more effectively.

Here, the recognized text information may include trademark information located on the exterior of the item, and the item information may include at least one of type information of the item, shape information of the item, or manufacturer information of the item. In an alternative embodiment, the item information may include various information related to the item.

The processor 190 may receive, from the information providing system 300, at least one of item information of an unidentified item, text information including expiration date information, or location information of the text information through the communicator 110, and store the received information in the memory 150. That is, the refrigerator 100 may receive, from the external information providing system 300, information about an item which is not recognized by the refrigerator itself, and use the received information.

Figure 4:
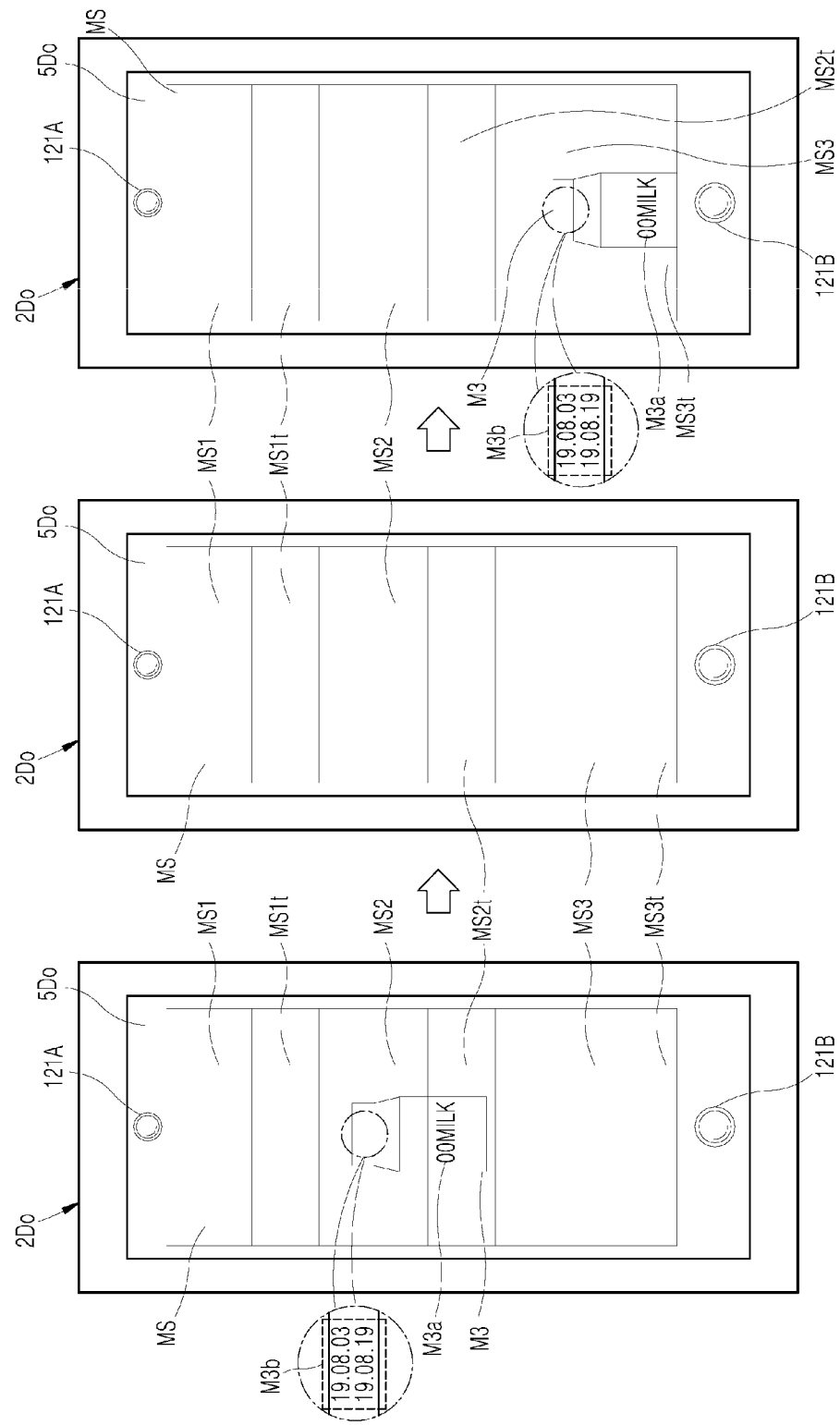
FIGS. 4 and 5 are diagrams illustrating an operating method of a refrigerator according to various embodiments of the present disclosure.
Figure 5:
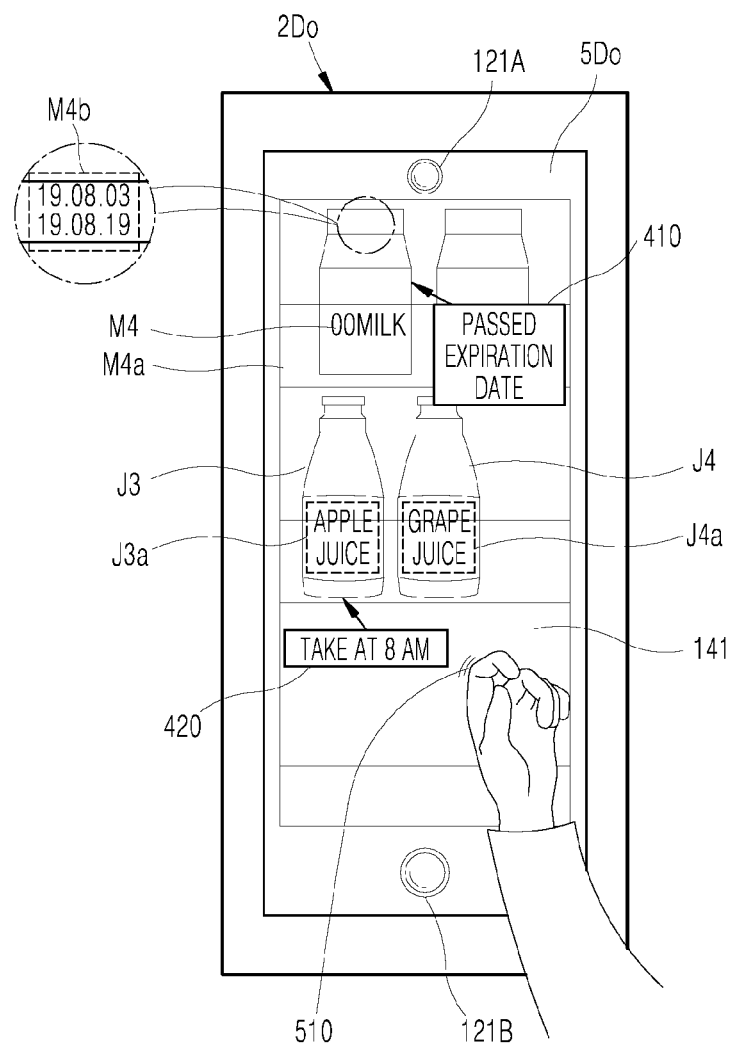

FIGS. 4 and 5 are diagrams illustrating an operating method of a refrigerator 100 according to various embodiments of the present disclosure.

FIG. 4 is a diagram illustrating a process in which the same item is withdrawn from a refrigerator 100 and re-stored in the refrigerator 100 after a predetermined time, according to an embodiment of the present disclosure.

First, an internal storage space MS of a second door 2Do may be exposed to the outside while the second door 2Do and a fifth door 5Do are closed. Specifically, a light emitter (for example, an LED) may be disposed inside the second door 2Do, and the light emitter may emit light in response to predetermined events such as a knocking event or a voice command event.

First, an item M3 may be disposed in the internal storage space MS of the second door 2Do of the refrigerator 100. The item M3 may be disposed in a middle storage space MS2 of the internal storage space MS, and may be disposed on a middle shelf MS2t. The item M3 may include first text information M3a and second text information M3b. The second text information M3b may include expiration date information including a manufacturing date and an expiration date.

The user may take the item M3 out of the refrigerator 100 to drink the contents of the item M3. The item M3 is thus now absent from the middle storage space MS2.

The processor 190 may then recognize the item M3 being placed back into the internal storage space MS. When placed back into the internal storage space MS, the item M3 may be disposed in a lower storage space MS3, and may be disposed on a lower shelf MS3t.

Based on the first text information M3a and the second text information M3b, the processor 190 may recognize that the item is the same item as the previously placed item on the basis of text.

FIG. 5 is a diagram illustrating an operating method of a refrigerator 100 according to an embodiment of the present disclosure.

A second door 2Do may include a fifth door 5Do, and the fifth door 5Do may expose an internal storage space MS of the second door 2Do. The fifth door 5Do may include a transparent display 141.

According to an embodiment of the present disclosure, while the fifth door 5Do is closed, a processor 190 may control the light emitter in the storage space MS located inside the second door 2Do such that the storage space MS is exposed when a knocking event occurs at a predetermined point 510 of the fifth door 5Do.

When the knocking event occurs on the fifth door 5Do, the processor 190 may output, via the transparent display 141, at least one of item information, text information, or notification information of an expiration date of the item disposed in the storage space MS located inside the second door 2Do, based on augmented reality.

For example, the processor 190 may recognize text information M4b of a specific item M4, and output, via the transparent display 141, notification information 410 ("Passed expiration date"), indicating that the expiration date has passed.

In addition, the processor 190 may output, via the transparent display 141, consumption time information 420 ("Take at 8 am") with respect to a specific item J3.

Figure 6:
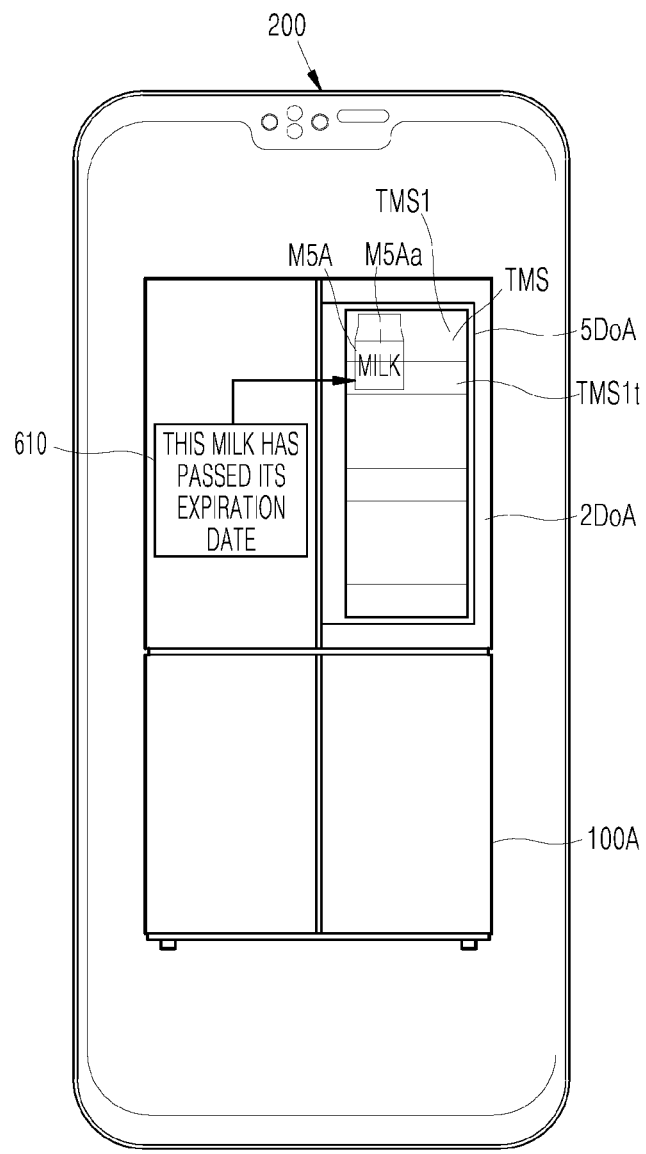
FIG. 6 is a diagram illustrating operation of a mobile terminal in communication with a refrigerator according to an embodiment of the present disclosure.

FIG. 6 is a diagram illustrating operation of a mobile terminal 200 in communication with a refrigerator 100 according to an embodiment of the present disclosure.

The mobile terminal 200 may receive information related to the refrigerator 100 and information about an item from the refrigerator 100, and show the information on the display of the mobile terminal 200. In detail, the mobile terminal 200 may output an exterior of a refrigerator 100A, and show an internal storage space TMS of a second door 2DoA. When an item M5A placed in upper storage space TMS1 of the storage space TMS has passed its expiration date, the mobile terminal 200 may display expiration date passed information 610.

Figure 7:
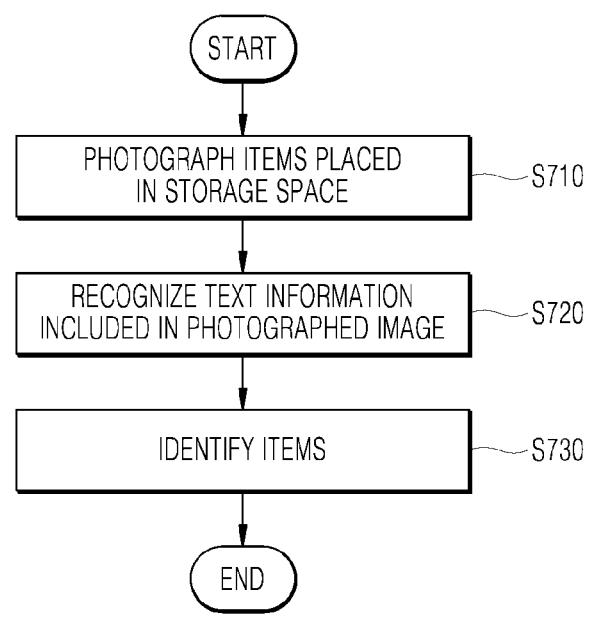
FIG. 7 is a sequence diagram illustrating an operating method of a refrigerator according to an embodiment of the present disclosure.

FIG. 7 is a sequence diagram illustrating an operating method of a refrigerator 100 according to an embodiment of the present disclosure.

First, in S710, the refrigerator 100 photographs an item placed in one or more storage spaces.

Next, in S720, the refrigerator 100 recognizes text information included in the photographed image of the item placed in the storage space.

Thereafter, in S730, the refrigerator 100 compares the recognized text information with previously stored text information to identify an item placed in the storage space.

When the item placed in the storage space is not identified in the comparison, the refrigerator 100 transmits a photographed image of the item placed in the storage space to an information providing system 300.

When the item placed in the storage space is identified in the comparison, the method of operating the refrigerator 100 may further include recognizing expiration date information of the identified item on the basis of text, and storing the recognized expiration date information of the item.

The operating method of the refrigerator 100 may further include distinguishing whether the identified item is an item that was previously placed in the storage space or an item that is newly placed in the storage space, based on the stored expiration date information of the item.

The present disclosure described above may be implemented as a computer-readable code in a medium on which a program is written. The computer readable medium includes all types of recording devices in which data readable by a computer system can be stored. Examples of the computer readable medium include a hard disk drive (HDD), a solid state disk (SSD), a silicon disk drive (SDD), a read-only memory (ROM), a random-access memory (RAM), CD-ROM, a magnetic tape, a floppy disk, and an optical data storage device. In addition, the above-mentioned computer may also include a processor 190 of a refrigerator 100.

In the foregoing, while specific embodiments of the present disclosure have been described for illustrative purposes, the scope or spirit of the present disclosure is not limited thereto, it will be understood by those skilled in the art that various changes and modifications can be made to other specific embodiments without departing from the spirit and scope of the present disclosure. Therefore, the scope of the present disclosure should be defined not by the above-described embodiments but by the technical idea defined in the following claims.

What is claimed is:

1. A refrigerator, comprising:
    a camera configured to photograph an item placed in one or more storage spaces;
    a communicator configured to communicate with an information providing system;
    a memory configured to store item information of the item and text information displayed on an exterior of the item; and
    a processor configured to identify the item placed in the one or more storage spaces by recognizing text information included in a photographed image of the item photographed by the camera, and comparing the recognized text information with the text information displayed on the exterior of the item,
    wherein in response to the item placed in the one or more storage spaces not identified in the comparison, the processor transmits the photographed image to the information providing system via the communicator, receives information of the item corresponding to the photographed image from the information providing system via the communicator and stores the received information of the item in the memory.

2. The refrigerator of claim 1, wherein when the item placed in the one or more storage spaces is identified in the comparison, the processor recognizes expiration date information of the identified item based on text, and stores the expiration date information of the identified item in the memory.

3. The refrigerator of claim 2, wherein the processor distinguishes whether the item identified in the comparison is a previously placed item in the one or more storage spaces or a newly placed item in the one or more storage spaces, based on the expiration date information of the item stored in the memory.

4. The refrigerator of claim 1, wherein the recognized text information comprises trademark information displayed on the exterior of the item, and the item information comprises at least one of classification information of the item, shape information of the item, or manufacturer information of the item.

5. The refrigerator of claim 4, wherein the processor receives, from the information providing system via the communicator, at least one of item information of an item that has not been identified, text information comprising expiration date information, or location information of the text information, and stores the received information in the memory.

6. The refrigerator of claim 1, further comprising:
a main body which contains a storage compartment comprising the one or more storage spaces; and
a first door which is hinged to the main body to rotate in front of one side of the storage compartment,
wherein the one or more storage spaces comprise a storage space located inside the first door.

7. The refrigerator of claim 6, further comprising a second door which exposes the storage space located inside the first door.

8. The refrigerator of claim 7, wherein
the second door comprises a transparent display, and
the processor controls a light emitter disposed in the storage space located inside the first door such that the storage space located inside the first door becomes visible when a knocking event occurs on the second door while the second door is closed.

9. The refrigerator of claim 8, wherein when the knocking event occurs on the second door, the processor outputs, via the transparent display, at least one of item information, text information, or notification information of an expiration date of the item disposed in the storage space located inside the first door, based on augmented reality.

10. The refrigerator of claim 1, wherein the processor transmits, via the communicator, item information of an item nearing an expiration date to a predetermined mobile terminal.

11. A method for operating a refrigerator, the method comprising:
photographing an item placed in one or more storage spaces;
recognizing text information included in a photographed image of the item placed in the one or more storage spaces;
identifying the item placed in the one or more storage spaces by comparing the recognized text information with previously stored text information;
transmitting the photographed image of the item placed in the one or more storage spaces to an information providing system when the item placed in the one or more storage spaces is not identified in the comparison;
receiving information of the item corresponding to the photographed image from the information providing system; and
storing the received information of the item.

12. The method of claim 11, further comprising, when the item placed in the one or more storage spaces is identified in the comparison, recognizing expiration date information of the identified item based on text, and storing the expiration date information of the identified item.

13. The method of claim 12, further comprising identifying whether the item identified in the comparison is a previously placed item in the one or more storage spaces or a newly placed item in the one or more storage spaces, based on previously stored expiration date information of the item.

14. An information providing system configured to communicate with one or more refrigerators, comprising:
a system communicator;
a system memory configured to store item information of one or more items and text information displayed on an exterior of the one or more items; and
a system processor configured to receive, via the system communicator, a photographed image of an item which was not identified by the refrigerator, recognize the item in the photographed image, and transmit, via the system communicator, item information of the item and text information displayed on an exterior of the item to the refrigerator which provided the photographed image
wherein the system processor is further configured to store a first deep neural network model in the system memory, the first deep neural network model being configured to estimate item information of the item and text information displayed on the exterior of the item based on the photographed image of the item.

* * * * *